United States Patent
Wei et al.

(10) Patent No.: US 10,708,347 B2
(45) Date of Patent: *Jul. 7, 2020

(54) MULTI-SERVICE APPLICATION FABRIC ARCHITECTURE

(71) Applicant: Microsoft Technology Licensing, LLC, Redmond, WA (US)

(72) Inventors: Zhen Wei, Sammamish, WA (US); Xiaolong Li, Sammamish, WA (US); Ke Wang, Redmond, WA (US); Sridhar Raman, Bellevue, WA (US); Ram Pratap Singh, REdmond, WA (US); Ananth Inamti Sundararaj, Sammamish, WA (US); Krishna Vitaldevara, Woodinville, WA (US); Jagadeesh Kunda, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/177,690

(22) Filed: Nov. 1, 2018

(65) Prior Publication Data

US 2019/0075155 A1 Mar. 7, 2019

Related U.S. Application Data

(63) Continuation of application No. 15/172,605, filed on Jun. 3, 2016, now Pat. No. 10,148,740.

(51) Int. Cl.
*H04L 29/08* (2006.01)
*G06F 9/50* (2006.01)
*G06Q 30/00* (2012.01)

(52) U.S. Cl.
CPC ............ *H04L 67/10* (2013.01); *G06F 9/5072* (2013.01); *G06F 9/5077* (2013.01); *G06Q 30/016* (2013.01)

(58) Field of Classification Search
CPC .............................. H04L 67/10; G06Q 30/016
See application file for complete search history.

(56) References Cited

U.S. PATENT DOCUMENTS

| | | |
|---|---|---|
| 2006/0242229 A1 | 10/2006 | Kinsey et al. |
| 2011/0055396 A1 | 3/2011 | Dehaan |

(Continued)

OTHER PUBLICATIONS

Ferry, et al., "Towards model-driven provisioning, deployment, monitoring, and adaptation of multi-cloud systems", In Proceedings of the IEEE Sixth International Conference on Cloud Computing, Jun. 28, 2013, 8 pages.

(Continued)

*Primary Examiner* — Michael A Keller
(74) *Attorney, Agent, or Firm* — Jeffrey L. Ranck; Ranck IP Law (57) ABSTRACT

In representative embodiments, multiple cloud computing infrastructures, each having its own application and management fabric, coexist with in the same cloud computing infrastructure. This results in a cloud computing infrastructure where multiple management fabrics and application fabrics coexist to offer their own services and cross platform services. Each functions independently and also communicates with each other to offer high availability and disaster recovery. One application and management infrastructure is a host to the other application and management infrastructure. The hosted infrastructure accesses underlying fabrics through the host infrastructure. A resultant system comprises a common hardware fabric, a common runtime, and a service fabric comprising services from both the host and hosted infrastructures.

19 Claims, 6 Drawing Sheets

(56) References Cited

U.S. PATENT DOCUMENTS

| | | | |
|---|---|---|---|
| 2012/0089726 A1 | 4/2012 | Doddavula | |
| 2012/0297016 A1 | 11/2012 | Iyer et al. | |
| 2012/0311568 A1 | 12/2012 | Jansen | |
| 2013/0198564 A1 | 8/2013 | Hasit | |
| 2013/0219033 A1 | 8/2013 | Agarwala et al. | |
| 2013/0318241 A1* | 11/2013 | Acharya | G06F 9/5072 709/226 |
| 2014/0006482 A1 | 1/2014 | Raghu et al. | |
| 2014/0108665 A1 | 4/2014 | Arora et al. | |
| 2014/0156813 A1 | 6/2014 | Zheng et al. | |
| 2014/0310705 A1* | 10/2014 | Bruso | G06F 9/45558 718/1 |
| 2014/0325503 A1 | 10/2014 | Li | |
| 2014/0344395 A1 | 11/2014 | Alexander | |
| 2015/0007169 A1 | 1/2015 | Li et al. | |
| 2015/0074278 A1 | 3/2015 | Maes et al. | |
| 2015/0163288 A1 | 6/2015 | Maes et al. | |
| 2015/0234644 A1 | 8/2015 | Ramanathan | |
| 2015/0261514 A1 | 9/2015 | Fu et al. | |
| 2016/0028581 A1 | 1/2016 | Khalsa et al. | |
| 2017/0289856 A1* | 10/2017 | Rune | H04W 36/0016 |
| 2017/0300309 A1* | 10/2017 | Berger | H04L 63/20 |

OTHER PUBLICATIONS

Kühn, et al., "Dynamic Migration of Cloud Services", In Proceedings of IEEE 3rd Symposium on Network Cloud Computing and Applications, Feb. 5, 2014, 9 pages.

"International Search Report and Written Opinion Issued in PCT Application No. PCT/US2017/034101", dated Aug. 30, 2017, 16 Pages. (MS# 359718-WO-PCT).

* cited by examiner

MULTI-SERVICE APPLICATION FABRIC ARCHITECTURE

CROSS-REFERENCE TO RELATED APPLICATIONS

This application is a continuation of U.S. application Ser. No. 15/172,605, filed Jun. 3, 2016.

FIELD

This application relates generally to improving cloud service infrastructure. More specifically, embodiments disclosed herein illustrate a service architecture that can host another service architecture.

BACKGROUND

Cloud computing has become quite popular in recent years. Generally speaking, cloud computing involves delivery of computing as a service rather than a product, whereby shared resources (software, storage resources, etc.) are provided to computing devices as a service. The resources are shared over a network, which is typically the internet. Applications and services are typically developed for a particular cloud computing platform and architecture and deployed thereon. In this sense, the entity that develops and deploys the applications and services may or may not be the same entity that provides the hardware platform and management infrastructure. Delivering software as a service allows developers to focus on providing the applications and services without worrying about such items as provisioning hardware, adjusting the number and type of hardware available as demand for the applications and/or services increases and decreases, and so forth.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

A Typical cloud infrastructure has its own management and application fabrics. For example, consider two cloud infrastructures A and B. Such a situation can arise, for example, where different teams build different products and services. As an example, perhaps one team builds a solution for email and another team builds a solution for document exchange had document management. Even if these two teams use a common development platform with a common operating system or even if the two teams use a common model for a basic cloud infrastructure, the two teams will usually end up creating different machine and application fabrics on which to build the services they ultimately offer to their customers. Thus, management of the two systems can be quite different and developing services to offer on top of these two cloud infrastructures (which include different machine and application fabrics) is very different.

Sometimes a developer wants to host a service that is built on infrastructure A in infrastructure B. This can be part of a unification effort to eliminate redundant management and application fabrics, an attempt to simplify management and deployment, a desire to take advantage of some of the characteristics of another infrastructure, or for any number of other reasons. In such a situation, the developer needs to re-write a bunch of management and application infrastructure pieces in order to get the pieces of infrastructure A running on infrastructure B. Embodiments disclosed herein disclose a multi-service architecture where multiple service architectures are hosted. This solution eliminates most of the work on developer since "multi-service architecture" has ability to run both the fabrics side by side thus allowing developer to host the service seamlessly. This creates a system where developers are free to worry about the business logic and experiences they wish to provide to their users and the underlying fabrics of any choice is available automatically.

Description

Figure 1:
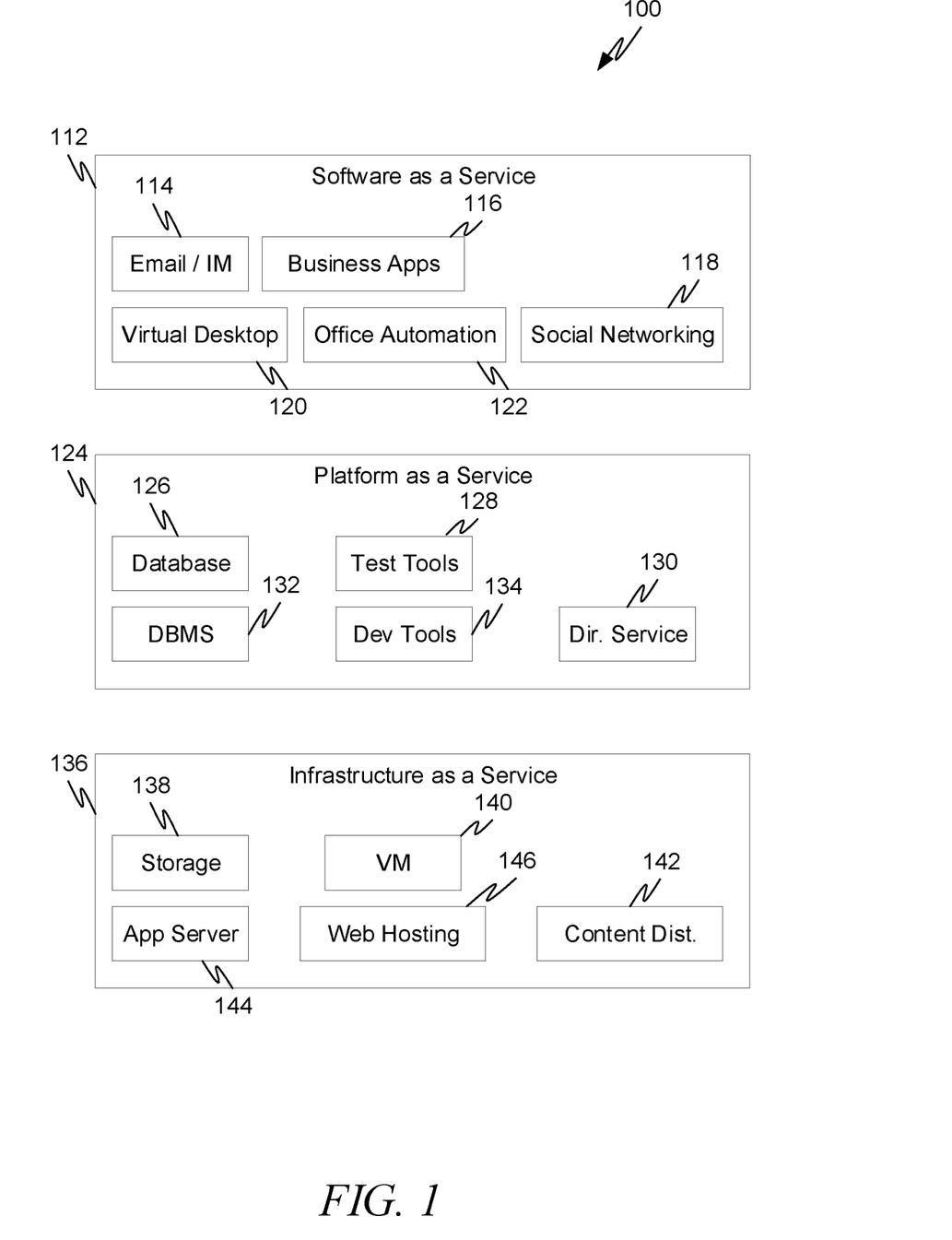
FIG. 1 illustrates an example of a cloud infrastructure.

FIG. 1 is a diagram illustrating cloud service offerings. IT departments, developers, users, system administrators, or others may rely on infrastructure, platforms, and/or software provided as part of cloud service offerings to implement applications and/or provide services. Such a cloud services can be based on a public cloud, private cloud or a combination thereof.

FIG. 1 illustrates an embodiment of cloud service offerings generally as 100. Often descriptions of such offerings are grouped into Infrastructure as a Service (IaaS) 136, Platform as a Service (PaaS) 124 and/or Software as a Service (SaaS) 112. IaaS 136 may include various infrastructure type offerings such as storage 138, virtual machines 140, content distribution 142, web hosting 146, application servers 144, etc. IaaS 136 may also include physical machines as well as virtual machines 140. PaaS 124 may include various platform type offerings such as a database 126, database management systems 132, testing tools 128, development tools 134, directory services 130, etc. SaaS 112 may include various software type offerings such as email/instant messaging 114, business applications 116, social networking 118, office automation 122, virtual desktops 120, etc. The various types of offerings illustrated in conjunction with IaaS 136, PaaS 124 and SaaS 112 are simply representative and other offerings may also be included and/or provided.

A fabric generally refers to all of the physical and virtual resources under the scope of management of the fabric management infrastructure. The fabric's role is to abstract the underlying physical and logical architecture from the developer, and—typically—to assume the burden of scaling. A fabric is thus a way of grouping aspects of cloud services together to simplify development, deployment, and so forth. A fabric is often used in conjunction with microservices, which is a software architecture style in which complex applications are composed of small processes communicating with each other through some mechanism such as an API. Thus, particular fabric layers discussed herein comprise the services, microservices, applications and so forth necessary to accomplish the purpose of the fabric layer.

With respect to the architecture diagram of FIG. 1, a fabric would include the physical and virtual resources and the scope of management of the fabric and abstract out the underlying physical and logical architecture from the developer. Thus, for example, application and management fabrics are typically part of a particular cloud computing infrastructure that provide services to manage hardware and virtual resources and provide an application services layer which is the platform model that developers use to provide other services or end user services, such as email, line of business applications, and so forth.

In the discussion below, no distinction will be given services and microservices and both will simply be referred to as services. This means that although a given service is illustrated or discussed, the service may be a more monolithic service, a microservice, or a more monolithic service that is actually implemented by microservices.

The different fabric layers in a given cloud service architecture also give a sense for how "high level" a given service, microservice, application, etc. in the layer is compared to others. Furthermore, different fabric layers are typically directed to particular types of functionality, like management of hardware resources, providing customer experiences, etc. The fabric layers of the embodiments below, are typically separated out by function (i.e., customer focused, machine focused, etc.) and functions of a "higher" layer can use functionality provided by a "lower" layer.

Figure 2:
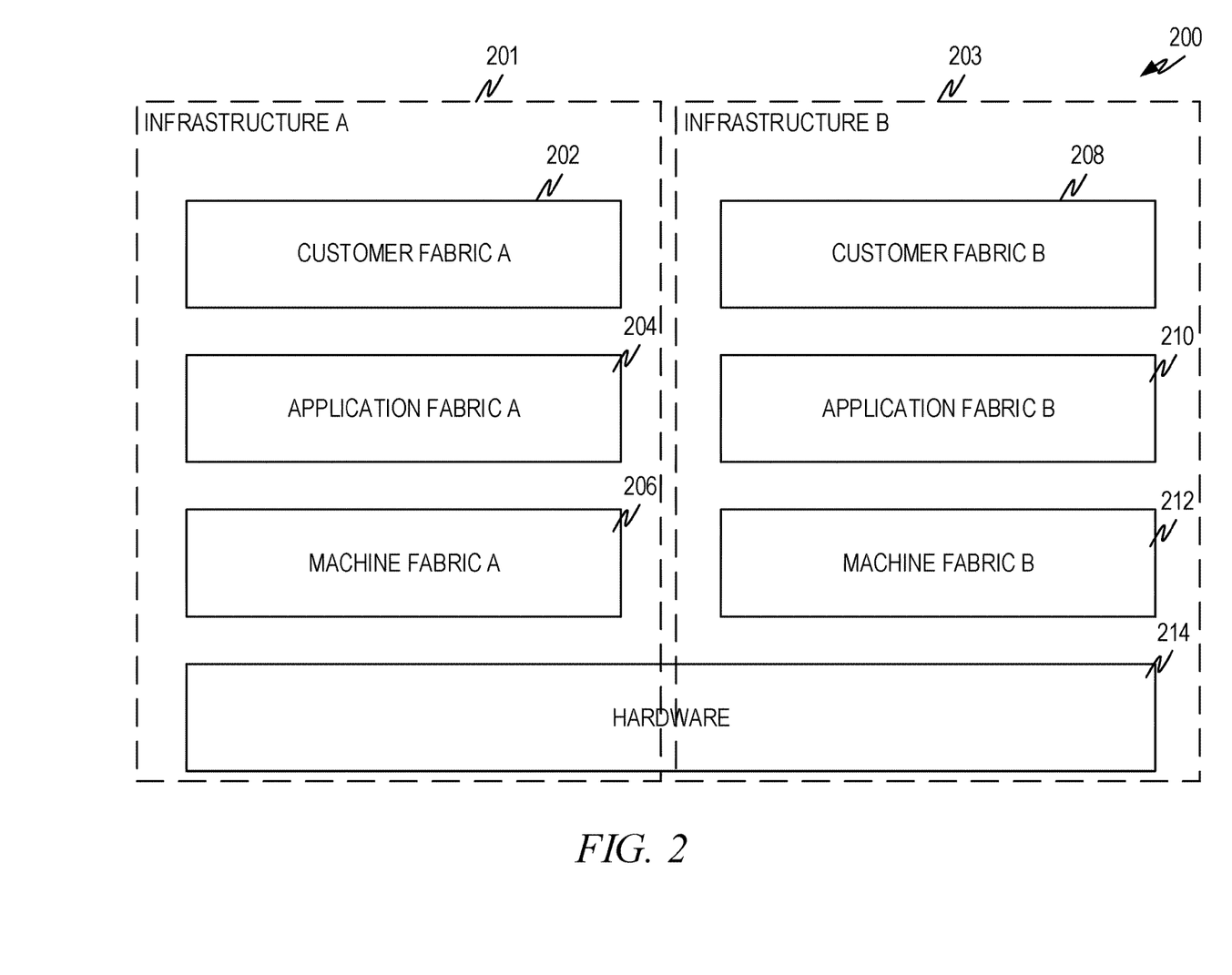
FIG. 2 illustrates an example of one application fabric hosting another application fabric along with common machine fabrics and hardware.

FIG. 2 illustrates an example of a cloud infrastructure 200 with two basic cloud computing infrastructures, infrastructure A 201 and infrastructure B 203. Each infrastructure can comprise hardware (214), multiple machine (206, 212), service (204, 210) and customer fabrics (202, 208). In this illustration, the two cloud infrastructures run on a common hardware platform 214, although the two infrastructures could just as easily run on different hardware platforms, or multiple hardware platforms either of the same or different types. In FIG. 2, the hardware layer (platform) is illustrated by 214 and represents the hardware platform utilized by infrastructures A 201 and B 203.

On top of the hardware layer 214 is the machine fabric. The machine fabric is responsible for things such as supply chain (in terms of ensuring the right resources are deployed to make the other layers work); data center management (management of the machines of the data center), rack management (management of the hardware in the racks in the data center), network management (management of the physical and virtual network resources), server management (management of the servers in the data center), virtual machine management (management of the virtual machines, etc. in the data center), lifecycle management, and so forth. The machine fabric is also sometimes referred to as the management fabric. In the representative embodiment of FIG. 2, two machine fabrics exist, machine fabric A 206 and machine fabric B 212.

On top of the machine fabric AB (206/212) is the service fabric. The service fabric is responsible for providing services on which services/apps in the customer fabric rely, like application-informed changes, business policies, multi-tenancy, efficiency, trust. Thus, this layer can include experience and platform features like alerts, access management, performance counters, and so forth. FIG. 2 illustrates two service fabrics: service fabric A 204 and service fabric B 210. The service fabric is also referred to as the application fabric.

On top of the service fabric is the customer fabric, illustrated in FIG. 2 as customer fabric A 202 and customer fabric B 208. The customer fabric is responsible for providing services, micro-services, and/or applications specifically related to the overall service provided to the customer like specific aspects related to management of customers, connections, usage, engagements, experiences provided to a user, etc. Thus, if a service provided to the customer is email, then the customer layer may comprise such things as support insights (information related to support status of the service), overall email service health, email service health provided to a particular customer/user, and so forth.

Figure 3:
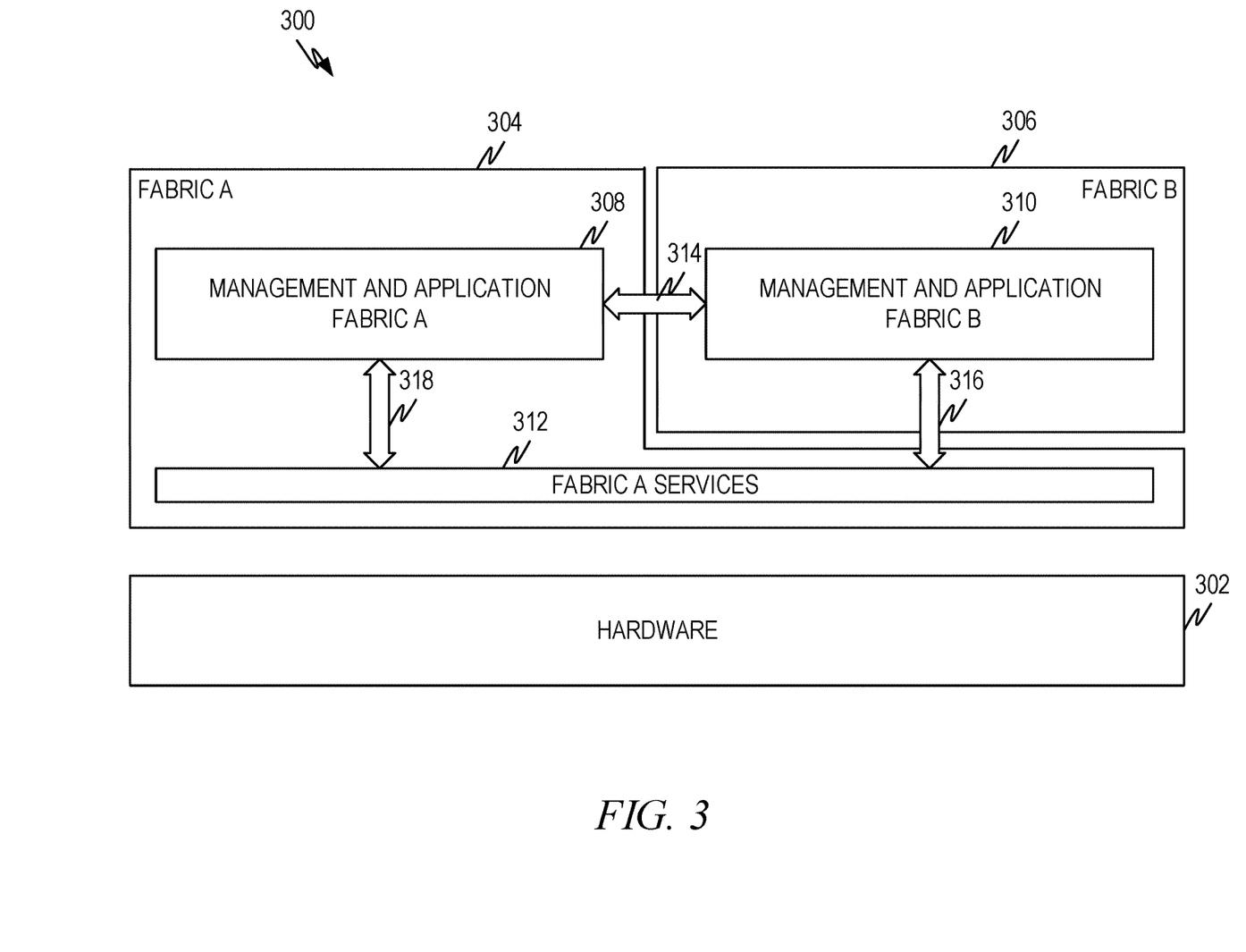
FIG. 3 illustrates an example of one application and management fabric hosting another application and management fabric.

FIG. 3 illustrates an example of one application and management fabric hosting another application and management fabric. In this embodiment, shown generally as 300, includes a hardware layer 302, which represents the hardware platform upon which the architectures are built. The hardware layer 302 can represent a single machine, in some embodiments. However, most often hardware layer 302 represents multiple machines, virtual machines, etc. upon which the architecture is deployed.

In FIG. 3 fabric A 304 hosts fabric B 306. Fabric A is referred to herein as a host fabric and fabric B is referred to herein as a tenant fabric. Fabric A has management and application fabrics A 308 and fabric B has management and application fabrics B 310. The management fabric provides deployment (deployment of the pieces that make up services, applications, etc. across machines, virtual machines, etc. in the data center), monitoring model (how things like services, data, applications and so forth are monitored), data insights (metrics and other information regarding utilization and so forth), service agility (expanding, contracting resources, reliability, etc.), and is where other rich services can be developed. The application fabric provides overall services (including for example, end user services like email, applications, etc.), experience (including features of the end user services like adding something to a calendar that was received in email), and platform features.

In FIG. 3, management and application fabrics A 308 can communicate with management and application fabrics B 310 and vice versa as indicted by communication channel 314. This can allow coordination and communication between the management and application fabrics to accomplish things such as management of services, applications and so forth hosted on the fabrics. It can also allow orchestration of services or application deployment based on signals from both the fabrics to offer high availability. Other capability in some embodiments include taking advantage of security, disaster recover, privacy etc. built on one or all fabrics by an application developer. Furthermore, since multiple underlying fabrics are provided, application development can focus on business logic and experiences and the underlying fabric needed to support them can be available automatically.

Fabric A 304 has fabric A services 312. Fabric A services 312 can be part of management and application fabric A 308, but is broken out here for purposes of explanation. Both management and application fabric A 308 and management and application fabric B 310 use fabric A services 312 to accomplish needed tasks as indicated by 316 and 318. Sample tasks are illustrated and discussed below. In addition, fabric A services 312 can be written and deployed as traditional services, microservices, or any other architecture, and/or any combination thereof.

The architecture of FIG. 3 allows support of multiple fabrics within a single infrastructure and can reduce or eliminate the need to re-write a lot of management and infrastructure pieces when one cloud services architecture is moved to another cloud services architecture.

Figure 4:
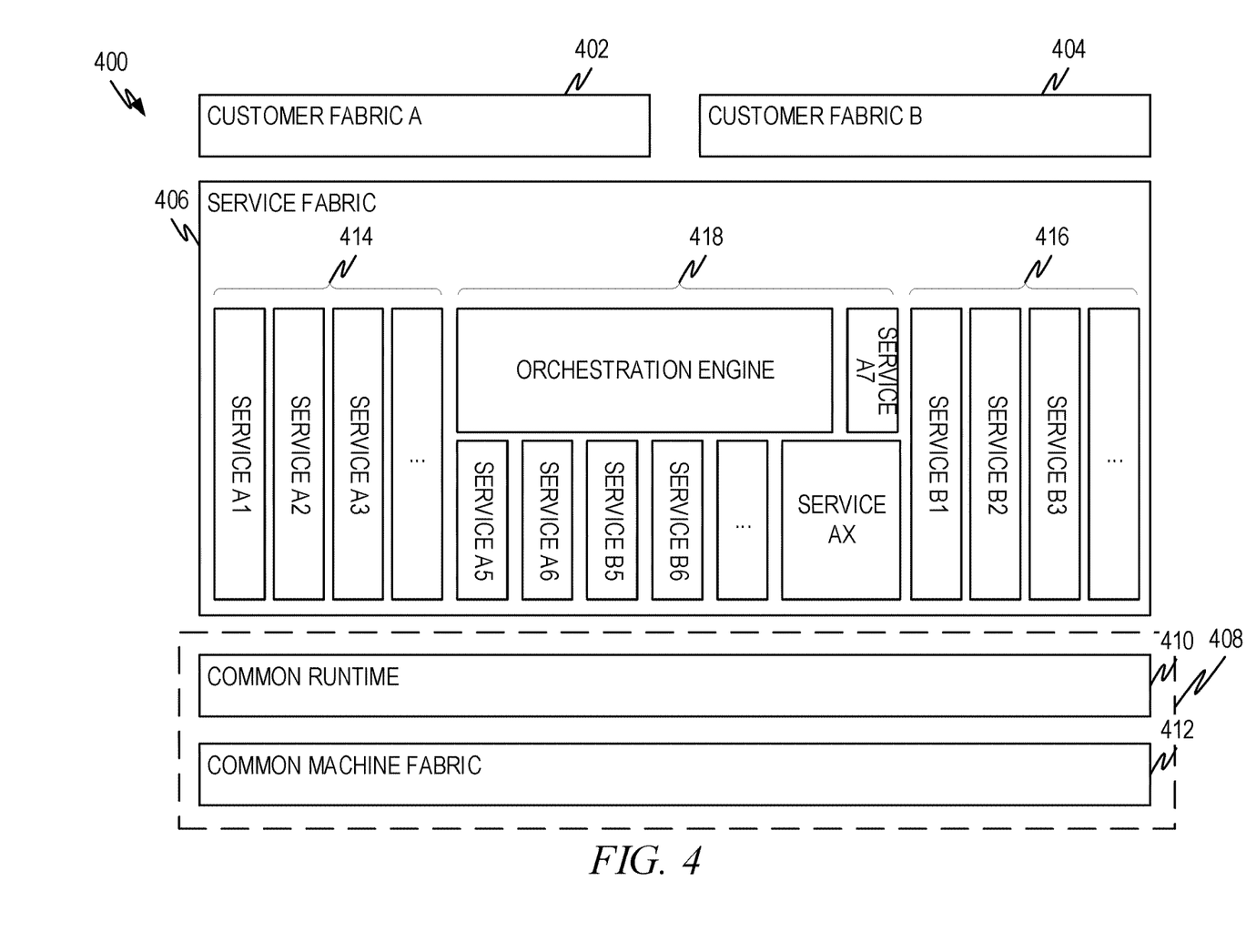
FIG. 4 illustrates an example of one application and management fabric hosting another application and management fabric.

FIG. 4 illustrates an example of one application and management fabric hosting another application and management fabric. The architecture, shown generally as 400, comprises a machine layer 408 comprising a common machine fabric 412 and a common runtime 410. The common machine fabric 412 controls physical assets in the datacenter. Thus, the common machine fabric 412 provides supply chain, data center, rack, network, server, and other hardware/virtual resource management as well as lifecycle management (supply chain, machines and other hardware). In some embodiments, where multiple different hardware platforms are used by the datacenter, the common machine fabric 412 works on the relevant hardware platforms. Furthermore, when multiple data centers are involved, the common machine fabric 412 would be available in the relevant data centers.

The architecture also comprises a common runtime 410. The common runtime 410 allows code (services, applications, etc.) to run side-by-side without being in the same depot, code base, or co-development model. The common runtime 410 can provide support for particular services, etc. expected by different service layers such as build distribution, watch dogs, and so forth. Furthermore, the common runtime 410 can run on every machine (physical and/or virtual) in the ecosystem.

The common runtime 410 provides the programming model for services, etc. that are developed for service fabric 406 (discussed below) and can abstract out some elements of the underlying machine fabric, if needed. For example, if, during a migration or upgrade process the common machine fabric is replaced with a different underlying machine fabric, then the common runtime 410 can hide those details from the services in the service layer, so that the machine fabric 412 can be replaced without affecting the operation of services in service fabric 406.

The architecture 400 also includes service fabric 406. Service fabric 406 provides services, applications, etc. needed to provide application informed changes (changes in other things like data stores, etc. that are created by the application), business policies (also referred to as business logic), multi-tenancy (multiple copies of code running to provide reliability, scalability, etc.), trust (controlled access to sensitive/secure information, etc.) and so forth. The service fabric 406 can also provide the mechanisms to ensure things are operating efficiently.

The service fabric 406 is constructed so that fabric A is the host fabric and fabric B is a tenant fabric. The service fabric 406 can include a combination of three types of services. Since the service fabric 406 supports multiple types of cloud infrastructures (along with their fabrics), the services for multiple fabrics can be incorporated into the service fabric 406. If, for example, the service fabric 406 supports two fabrics A and B, there could be some services that are provided by either fabric A, fabric B or both fabric A and fabric B. In FIG. 3 the services that are provided by fabric A are illustrated as services 414 while the services provided by fabric B are illustrated as services 416.

The set of services 414 of fabric A and the set of services 416 of fabric B can be non-overlapping, partially overlapping or fully overlapping. For example, consider a situation where the fabric A services 414 provides alerts, monitoring and activity management and the fabric B services 416 provides performance counters, deployment and monitoring. Both fabric A services 414 and fabric B services 416 provide monitoring. This is a situation where two services that provide the same or similar functionality are allowed to exist side-by-side. In this situation, the services, applications, etc. that utilize service fabric 406 are free to use either monitoring service. The conditions under which services performing the same or similar functions can exist side-by-side are discussed in greater detail below.

In the above example, the fabric A services 414 and fabric B services 416 that are not in common (i.e., alerts and activity management for fabric A services 414 and performance counters and deployment for fabric B services 416) may provide functionality that is used by both fabrics or may provide functionality that overlaps somewhat, but one fabric uses one service and the other fabric uses the other service. For example, if activity management from fabric A services 414 and performance counter from fabric B services 416 both monitor the activity of services, applications, etc. but the performance counter from fabric B services 416 also provides performance monitoring, then services, applications, and so forth utilizing the two different fabrics (A and B) may use the respective services for any number of reasons, including that was the way they expected the service to be provided when the service, application, and so forth was initially developed.

The service fabric 406 also includes a set of services 418 that do not exist side-by-side with services from another fabric. These services represent services that are provide to support both fabrics in some fashion. This set of services 418 typically provides functionality not provided by other services. Conditions when services should be placed into this set are discussed in greater detail below.

As a representative example of a service that might be in service set 418, consider service which provides cross data center change orchestration, such as cross-data center orchestration engine 420. This service may provide, for example, multi-tenancy (multiple copies of the same code running on the same/different system, virtual machine, container, etc.), logical inventory, trust, business policy enforcement (such as services will only be run on production quality systems and not systems with test code), and/or other functions/services. In this situation, both fabrics A and B can utilize the same orchestration engine 420. To implement orchestration the way that both fabrics expect and need, the orchestration engine 420 can rely on specific services provided by the different fabrics. An example from FIG. 4 may be service A5, service A6, service B5, service B6 and so forth. Perhaps, for example, fabric A needs a different deployment service than fabric B but both can be controlled by a common orchestration engine 420. Thus, services can be layered in different ways to accomplish desired goals.

The service fabric 406 can provide consistent interfaces to services, applications, and so forth that utilize fabric 406. In other words, the service fabric 406 can appear to services, applications, and so forth that utilize it like either service fabric A or service fabric B, depending on what the service, application, and so forth expects to be provided from fabric A or fabric B, respectively. Thus, for a service, application, and so forth created to interact with fabric A, the service fabric 406 looks like fabric A and for a service, application, and so forth created to interact with fabric B, the service fabric 406 looks like fabric B. This can be accomplished by the service, application, and so forth implementing the appropriate interface (API, etc.) for the appropriate fabric(s). Stated another way, from the developer's perspective, they are talking to the same thing that they would be talking to in the absence of the combined service fabric 406 and use of the "old" service fabric A or B as the case may be.

The architecture can comprise a plurality of customer fabrics such as customer fabric A 402 and customer fabric B 404. A customer fabric typically provides services, functions, etc. related to experiences, usage, engagement, connection with customers, and so on. It is built on top of service fabric and takes a more user centric view of the service and applications.

While the above discussions with regard to FIGS. 3 and 4 have been illustrated with two fabrics, A and B, the approach can be applied to more than just two fabrics. For example, a single fabric (A) can host a plurality of other fabrics (B and C).

Figure 5:
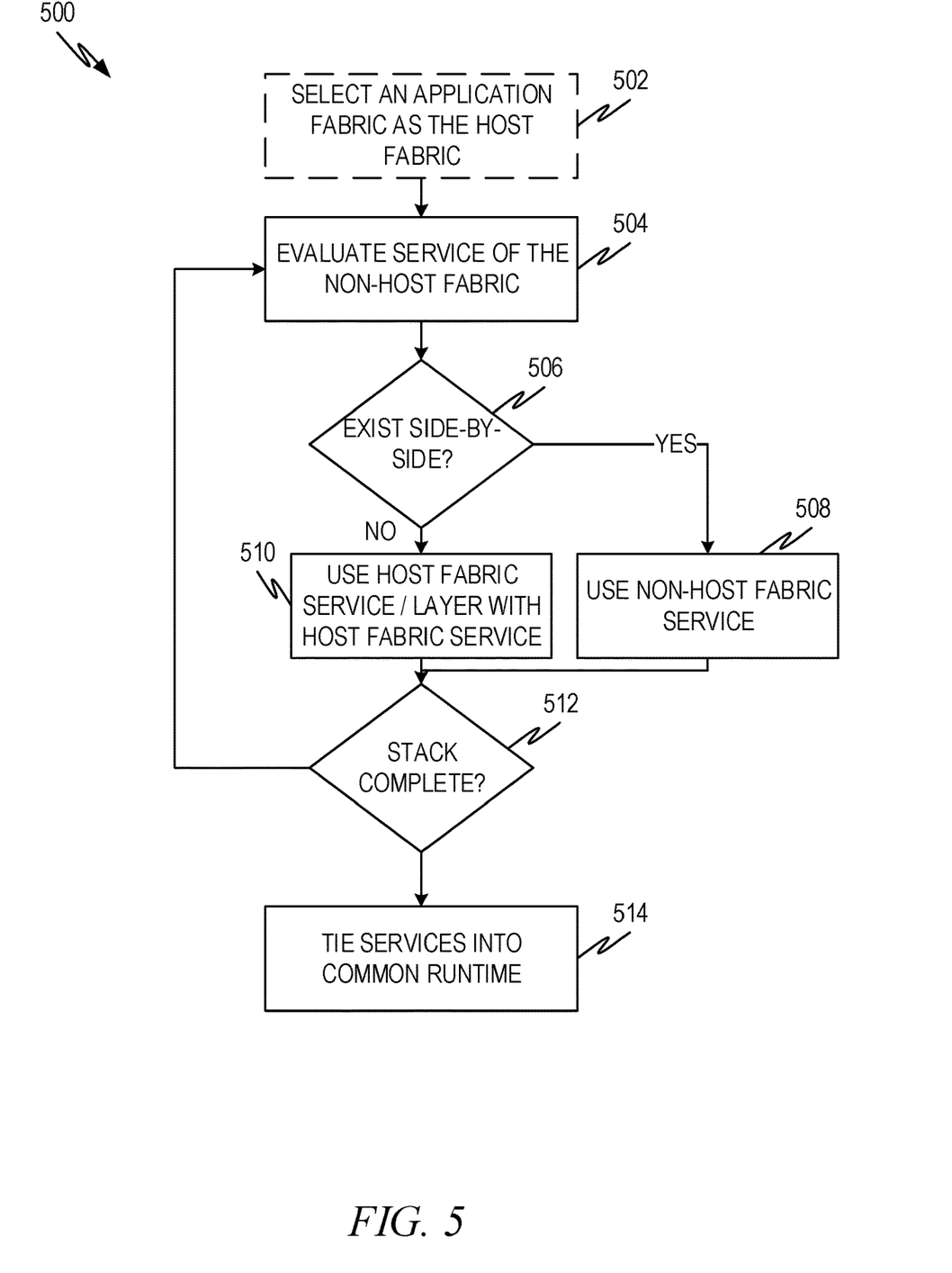
FIG. 5 illustrates a flow diagram for determining how the services of one application fabric can be hosted by another application fabric.

When creating a service fabric that supports multiple fabrics, one approach is to evaluate the services provided by the two fabrics and then select which fabrics will be allowed to exist side-by-side, and which will be combined and/or eliminated. FIG. 5 illustrates a flow diagram 500 for determining how the services of one application fabric can be hosted by another application fabric. In other words, the flow diagram 500 identifies the various steps to create a host/hosted fabric combination such as service fabric 406.

The method 500 of FIG. 5 starts in operation 502 where a service fabric is selected as the host fabric. Selecting the fabric can be based on a variety of factors. For example, the host fabric may be selected for some architectural reason. Thus one fabric may have a better architecture or the services are factored in a more appropriate fashion than the services of another fabric. The host fabric may be selected based on ease of modification, based on the number or type of services provided, based on adoption and deployment or any other factors. The operation is also specifically indicated as optional, since in some situations, the choice will determined in some other way.

Operation 504 calls for the evaluation of the host/non-host services. The evaluation of the host/non-host services is designed to identify the various sets of services. In other words it answers the question of whether a particular service will be 1) kept intact (i.e., be part of the fabric A services 414 or fabric B services 416), 2) eliminated and implemented using the service of the other fabric, and/or 3) eliminated/modified and implemented by layering with a service from the other fabric (i.e., be part of service set 420). Such decisions can be made based on whether the host fabric can exist side by side (operation 506), or whether it should be implemented by layering (service set 420) or through another service (operation 510).

A hosted service can exist side-by-side with a host service that accomplishes the same/similar function when the service makes no state changes to the underlying fabrics/layers. In this context state-changes is broadly interpreted and could include a state change in a hardware (including storage), the operating system, or an application layer, and so forth. For example, a service that performs monitoring is a "read only" service and makes no changes to anything. This is an example of a service that makes no state changes. A service that stores data in a storage location would not likely be a service that makes no state changes.

A service that makes state changes to hardware, operating system, application layer, and so forth would benefit from a single master service. Thus services that do this should either be eliminated and implemented through a host service or be eliminated by layering with a host service. This could result, for example, in a service in fabric A services 414 if a service is eliminated and implemented through a host service or a service in service set 418 if a service is eliminated and implemented through layering with a host service.

A service that is closely related to a specific customer promise would benefit from a single master. Sometimes this will result in elimination of one service and the service being eliminated and implemented either through a host service (fabric A services 414) or be eliminated by layering with a host service (service set 418. Sometimes this will mean keeping the service. Thus, for things like access control, it may be better to implement that in a single service that will serve all fabrics. On the other hand, things that are closely tied to a customer promise like "you have all the necessary privacy controls you need irrespective of the geographic location of a data center" or "your software won't be deployed on experimental systems" may benefit from allowing them to exist, for example in fabric B services 416, even if that means they exist side-by-side with a similar service from fabric A services 414 or service set 418. In some instances, these services will make state changes that would otherwise mean that they should be eliminated and implemented through a fabric A service 414 or service set 418.

In the situation where it is desirable for a service to be retained, but the service also makes a state change, the service that is being kept should get permission from the host fabric before making the state change. For example, if a service that provides privacy controls is closely tied to a customer promise but also makes a state change, prior to making any state change, the service can inform the relevant underlying host fabric service(s) and gain permission to make the appropriate state change. Sometimes this can be accomplished somewhat transparently by the host service. Because hosted services access underlying fabrics, etc. through the host service, the relevant host service can take note of the state change being made and either implement it or return an error to the hosted service. Variations can also be used (like the host service not returning an error but taking some other action like denying permission when a state change would be inappropriate).

Thus depending on the outcome of the analysis, the decision block 506 will identify whether the services should exist side by side (operation 508), should implemented by a host fabric service or be layered with a host fabric service (operation 510). Decision 512 ensures that all services are evaluated to assemble the appropriate set of services and how they will be implemented. Thus decision 512 loops back to operation 504 until all services have been examined.

The final operation is to ensure that the selected services use the common runtime such as common runtime 410 (operation 514). This is done by using the services provided by the runtime rather than using services of an underlying common machine fabric 412 or performing the function in some other fashion.

Example Machine Architecture and Machine-Readable Medium

Figure 6:
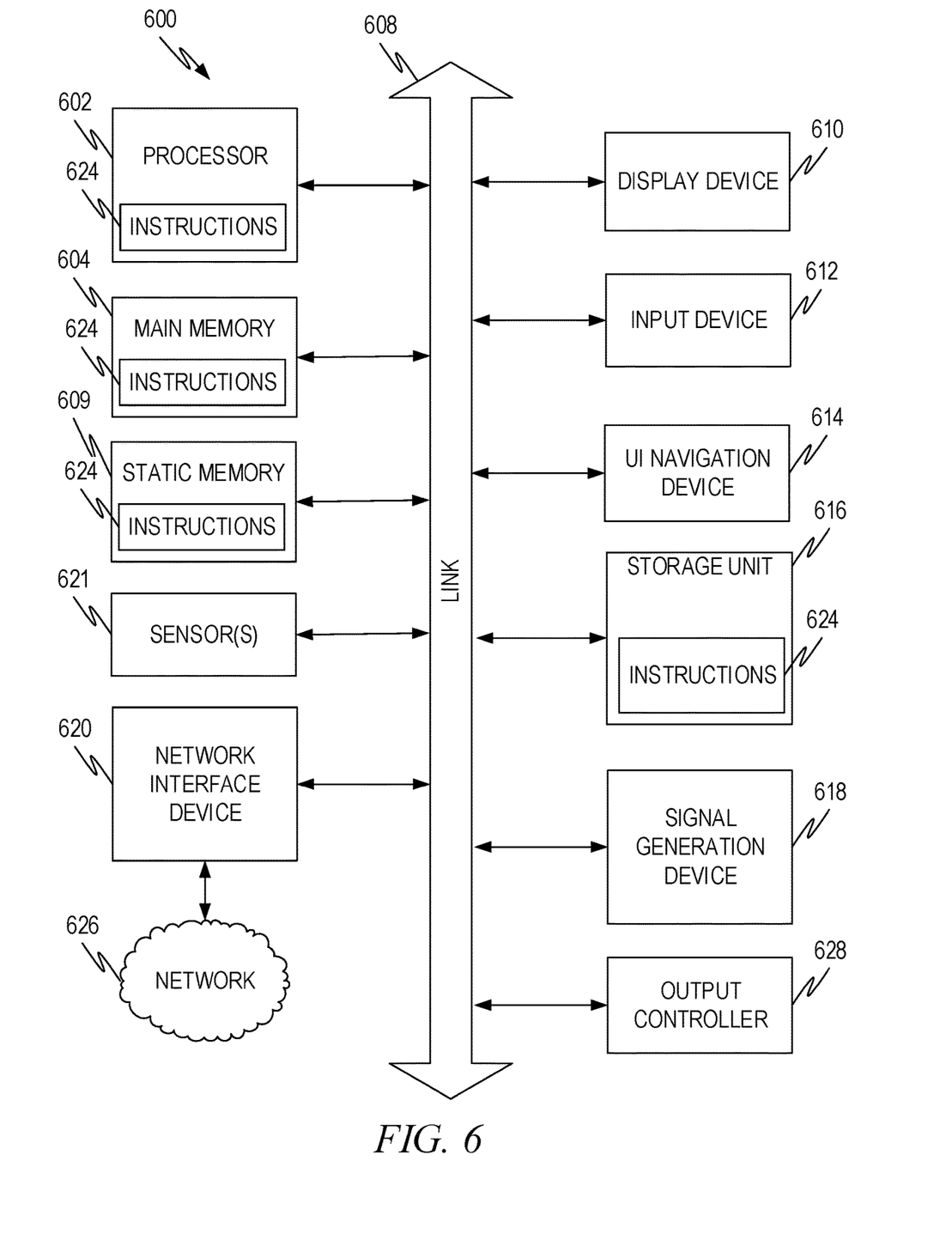
FIG. 6 illustrates a representative architecture of a machine suitable for hosting the application fabrics or executing the methods disclosed herein.

FIG. 6 is a diagram of a machine in the example form of a processing system within which may be executed a set of instructions for causing the machine to perform any one or more of the methodologies discussed herein including the functions, systems and flow diagrams thereof. The machine of FIG. 6 is shown as a standalone device, which is suitable for implementation of the concepts above, but most often the context of the above description will be a plurality of such machines operating in a data center and providing one or more of the cloud architectures disclosed above. Thus, while only a single machine is illustrated, the term "machine" shall also be taken to include any collection of machines that individually or jointly execute a set (or multiple sets) of instructions to perform any one or more of the methodologies discussed herein.

The example of the machine 600 includes at least one processor 602 (e.g., a central processing unit (CPU), a graphics processing unit (GPU), advanced processing unit (APU), or combinations thereof), one or more memories such as a main memory 604, a static memory 606, or other types of memory, which communicate with each other via bus 608. The machine 600 may include further optional aspects such as a graphics display unit 610 comprising any type of display. The machine 600 may also include other optional aspects such as an alphanumeric input device 612 (e.g., a keyboard, touch screen, and so forth), a user interface (UI) navigation device 614 (e.g., a mouse, trackball, touch device, and so forth), a storage unit 616 (e.g., disk drive or other storage device(s)), a signal generation device 618 (e.g., a speaker), sensor(s) 621 (e.g., global positioning sensor, accelerometer(s), microphone(s), camera(s), and so forth), output controller 628 (e.g., to control other devices), and a network interface device 620 (e.g., wired and/or wireless).

Executable Instructions and Machine-Readable Medium

The various memories (i.e., 604, 609, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-readable medium" and "computer-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media/computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms specifically exclude non-statutory signals per se, which are covered under the term "transmission medium" discussed below.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Transmission medium encompasses mechanisms by which the instructions 624 are transmitted, such as communication networks. Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes any form of modulated data signal and signals per se. The term "modulated data signal" means a signal that has one or more of its characteristics set or changed in such a matter as to encode information in the signal.

EXAMPLE EMBODIMENTS

The following represent example embodiments and different combinations of elements that are within the scope of the present disclosure.

Example 1

A computing system hosting multiple cloud computing infrastructures comprising:

a processor and executable instructions accessible on a machine-readable medium that, when executed, cause the system to perform operations comprising:

provide a common machine fabric layer comprising at least one service to control of physical assets in a datacenter;

provide a host service fabric layer in communication with the common machine fabric layer, the control fabric layer comprising a first set of services, the first set of services including at least one service related to business policy enforcement;

provide a tenant service fabric layer in communication with the host service fabric layer, the tenant service fabric layer providing a second set of services, at least one of which utilizes at least one service of the first set of services; and the first set of services providing support for a first plurality of customer services built upon the host fabric layer and the second set of services providing support for a second plurality of customer services built upon the tenant fabric layer.

Example 2

The computing system of Example 1, wherein the second set of services access the common machine fabric layer through the first set of services.

Example 3

The computing system of Example 1 or 2 wherein the host service fabric layer and the tenant service fabric layer are integrated into a same service fabric layer.

Example 4

The computing system of Example 3 wherein the same service fabric layer comprises three groups of services:
a first group of services utilized by services of a first customer fabric layer;
a second group of services utilized by services of a second customer fabric layer; and
a third group of services utilized by at least one service of the second group of services.

Example 5

The computing system of Example 4, wherein:
the first group of services are related to a first cloud service infrastructure;
the second group of services are related to a second cloud service infrastructure;
the third group of services are related to the first cloud service infrastructure.

Example 6

The computing system of Example 1, wherein the first set of services is utilized by services of a first customer fabric layer and wherein the second set of services is utilized by services of a second customer fabric layer.

Example 7

The computing system of Example 1, 2, or 6 further comprising a common runtime and wherein the host service fabric layer accesses the common hardware fabric layer through the common runtime layer.

Example 8

The computing system of Example 1, 2, or 6 further comprising a common runtime and wherein the common runtime provides communication between the first set of services and the second set of services.

Example 9

A method for hosting a tenant cloud computing infrastructure within a host cloud computing infrastructure comprising:
providing a common machine fabric layer comprising at least one service to control of physical assets in a datacenter;
providing a common runtime layer, the common runtime layer in communication with the common machine fabric layer;
providing a host service fabric layer in communication with the common runtime fabric layer, the host service fabric layer comprising a host set of services, the host set of services including at least one service related to business policy enforcement;
providing a tenant service fabric layer in communication with the host service fabric layer, the tenant service fabric layer providing a tenant set of services, at least one of which utilizes at least one service of the host set of services; and
the host set of services providing support for a first plurality of customer services built upon the host fabric layer and the tenant set of services providing support for a second plurality of customer services built upon the tenant fabric layer.

Example 10

The method of Example 9, wherein the tenant set of services accesses the common runtime layer or the common machine fabric layer through the host set of services.

Example 11

The method of Example 10 wherein prior to accessing the common runtime layer or the common machine fabric layer at least one service of the tenant set of services requests permission from at least one service of the host set of services.

Example 12

The method of Example 9, wherein at least one of the host set of services utilizes at least one of the tenant set of services.

Example 13

The method of Example 9 further comprising a communication channel between the host application fabric and the tenant application fabric.

Example 14

The method of Example 9, 10, 11, 12 or 13 wherein prior to making a state change, a service of the set of tenant services requests permission from a service of the set of host services.

Example 15

A machine-readable medium having executable instructions encoded thereon, which, when executed by at least one processor of a machine, cause the machine to perform operations comprising:
provide a host cloud service infrastructure comprising a host management fabric, a host application fabric, and a set of host services, the host cloud service infrastructure providing a first set of user services;
provide a tenant cloud service infrastructure comprising a tenant management fabric and a tenant application fabric, the tenant cloud service infrastructure providing a second set of user services; and
the tenant management fabric and tenant application fabric providing the second set of user services utilizing the first set of host services.

Example 16

A computing system hosting multiple cloud computing infrastructures comprising:
a processor and executable instructions accessible on a machine-readable medium that, when executed, cause the system to perform operations comprising:
provide a common machine fabric layer comprising at least one service to control of physical assets in a datacenter;
provide a host service fabric layer in communication with the common machine fabric layer, the control fabric layer comprising a first set of services, the first set of services including at least one service related to business policy enforcement;
provide a tenant service fabric layer in communication with the host service fabric layer, the tenant service fabric layer providing a second set of services, at least one of which utilizes at least one service of the first set of services; and the first set of services providing support for a first plurality of customer services built upon the host fabric layer and the second set of services providing support for a second plurality of customer services built upon the tenant fabric layer.

Example 17

The computing system of Example 16, wherein the second set of services access the common machine fabric layer through the first set of services.

Example 18

The computing system of Example 16 or 17 wherein the host service fabric layer and the tenant service fabric layer are integrated into a same service fabric layer.

Example 19

The computing system of Example 18 wherein the same service fabric layer comprises three groups of services:
a first group of services utilized by services of a first customer fabric layer;
a second group of services utilized by services of a second customer fabric layer; and
a third group of services utilized by at least one service of the second group of services.

Example 20

The computing system of Example 19, wherein:
the first group of services are related to a first cloud service infrastructure;
the second group of services are related to a second cloud service infrastructure;
the third group of services are related to the first cloud service infrastructure.

Example 21

The computing system of Example 16, 17, 18, 19 or 20, wherein the first set of services is utilized by services of a first customer fabric layer and wherein the second set of services is utilized by services of a second customer fabric layer.

Example 22

The computing system of Example 16, 17, 18, 19, 20, or 21 further comprising a common runtime and wherein the host service fabric layer accesses the common hardware fabric layer through the common runtime layer.

Example 23

The computing system of Example 16, 17, 18, 19, 20, 21, or 22 further comprising a common runtime and wherein the common runtime provides communication between the first set of services and the second set of services.

Example 24

A method for hosting a tenant cloud computing infrastructure within a host cloud computing infrastructure comprising:

providing a common machine fabric layer comprising at least one service to control of physical assets in a datacenter;

providing a common runtime layer, the common runtime layer in communication with the common machine fabric layer;

providing a host service fabric layer in communication with the common runtime fabric layer, the host service fabric layer comprising a host set of services, the host set of services including at least one service related to business policy enforcement;

providing a tenant service fabric layer in communication with the host service fabric layer, the tenant service fabric layer providing a tenant set of services, at least one of which utilizes at least one service of the host set of services; and the host set of services providing support for a first plurality of customer services built upon the host fabric layer and the tenant set of services providing support for a second plurality of customer services built upon the tenant fabric layer.

Example 25

The method of Example 24, wherein the tenant set of services accesses the common runtime layer or the common machine fabric layer through the host set of services.

Example 26

The method of Example 25 wherein prior to accessing the common runtime layer or the common machine fabric layer at least one service of the tenant set of services requests permission from at least one service of the host set of services.

Example 27

The method of Example 24, 25 or 26 wherein at least one of the host set of services utilizes at least one of the tenant set of services.

Example 28

The method of Example 24, 25, 26 or 27 further comprising a communication channel between the host application fabric and the tenant application fabric.

Example 29

The method of Example 24, 25, 26, 27 or 28 wherein prior to making a state change, a service of the set of tenant services requests permission from a service of the set of host services.

Example 30

A machine-readable medium having executable instructions encoded thereon, which, when executed by at least one processor of a machine, cause the machine to perform operations comprising:

provide a host cloud service infrastructure comprising a host management fabric, a host application fabric, and a set of host services, the host cloud service infrastructure providing a first set of user services;

provide a tenant cloud service infrastructure comprising a tenant management fabric and a tenant application fabric, the tenant cloud service infrastructure providing a second set of user services; and the tenant management fabric and tenant application fabric providing the second set of user services utilizing the first set of host services.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computing system hosting multiple cloud computing infrastructures comprising:
a processor and executable instructions accessible on a machine-readable medium that, when executed, cause the system to perform operations comprising:
provide a common machine layer comprising at least one service to control of physical assets in a datacenter;
provide an integrated service fabric layer in communication with the common machine layer, the integrated service fabric layer comprising:
a first set of services supporting a first customer fabric;
a second set of services supporting a second customer fabric; and
a third set of services that provides support for both the first customer fabric and the second customer fabric, the third set of services comprising an orchestration engine that provides cross-data center change orchestration for both the first customer fabric and the second customer fabric;
the first set of services providing support for a first plurality of customer services built upon the first customer fabric and the second set of services providing support for a second plurality of customer services built upon the second customer fabric.

2. The computing system of claim 1, wherein the second set of services access the common machine layer through the first set of services.

3. The computing system of claim 1 wherein the first set of services and the second set of services provide the same set of services to their respective fabrics.

4. The computing system of claim 1 wherein the first set of services or the second services or both utilize the third set of services.

5. The computing system of claim 1, wherein:
the first set of services are related to a first cloud service infrastructure;
the second set of services are related to a second cloud service infrastructure;
the third set of services are related to the first cloud service infrastructure.

6. The computing system of claim 1, wherein the third set of services provides service or application deployment based on signals from both fabrics through the orchestration engine.

7. The computing system of claim 1, further comprising a common runtime layer and wherein the first service fabric layer accesses the common machine layer through the common runtime layer.

8. The computing system of claim 1, further comprising a common runtime layer and wherein the common runtime layer provides communication between the first set of services and the second set of services.

9. The computing system of claim 1, wherein the orchestration engine further provides one or more of: multi-tenancy, logical inventory, trust management, and business policy enforcement.

10. A machine-readable medium having executable instructions encoded thereon, which, when executed by at least one processor of a machine, cause the machine to perform operations comprising:
provide a common machine layer comprising at least one service to control of physical assets in a datacenter;
provide an integrated service fabric layer in communication with the common machine layer, the integrated service fabric layer comprising:
a first set of services supporting a first customer fabric;
a second set of services supporting a second customer fabric; and
a third set of services that provides support for both the first customer fabric and the second customer fabric, the third set of services comprising an orchestration engine that provides cross-data center change orchestration for both the first customer fabric and the second customer fabric;
the first set of services providing support for a first plurality of customer services built upon the first customer fabric and the second set of services providing support for a second plurality of customer services built upon the second customer fabric.

11. The machine-readable medium of claim 10, wherein the second set of services access the common machine layer through the first set of services.

12. The machine-readable medium of claim 10, wherein the first set of services or the second services or both utilize the third set of services.

13. The machine-readable medium of claim 10 further comprising a communication channel between the first set of services and the second set of services.

14. The machine-readable medium of claim 10 wherein the third set of services provides service or application deployment based on signals from both fabrics through the orchestration engine.

15. The machine-readable medium of claim 10 further comprising a common runtime layer and wherein the common runtime layer provides communication between the first set of services and the second set of services.

16. The machine-readable medium of claim 10 wherein the orchestration engine further provides one or more of: multi-tenancy, logical inventory, trust management, and business policy enforcement.

17. A method for hosting a tenant cloud computing infrastructure within a host cloud computing infrastructure comprising:
providing a common machine fabric layer comprising at least one service to control of physical assets in a datacenter;
providing a common runtime layer, the common runtime layer in communication with the common machine fabric layer;
providing an integrated service fabric layer comprising:
a host service fabric layer in communication with the common runtime layer, the host service fabric layer comprising a first set of services related to a first cloud service infrastructure and an associated first customer fabric;
a tenant service fabric layer in communication with the host service fabric layer, the tenant service fabric layer providing a second set of services related to a second cloud service infrastructure and an associated second customer fabric; and a third set of services comprising an orchestration engine that provides cross-data center change orchestration for both the first customer fabric and the second customer fabric.

18. The method of claim 17, wherein the third set of services providing services not in the first set of services or in the second set of services.

19. The method of claim 17, wherein the third set of services provides service or application deployment based on signals from both fabrics through the orchestration engine.

* * * * *